United States Patent [19]

Togashi et al.

[11] Patent Number: 4,655,552
[45] Date of Patent: Apr. 7, 1987

[54] FLAT PANEL DISPLAY DEVICE HAVING ON-SCREEN DATA INPUT FUNCTION

[75] Inventors: Seigo Togashi; Etsuo Yamamoto; Katsumi Aota; Hiroshi Tanabe; Kanetaka Sekiguchi; Kazuaki Sorimachi, all of Tokorozawa, Japan

[73] Assignee: Citizen Watch Co., Ltd., Tokyo, Japan

[21] Appl. No.: 712,957

[22] Filed: Mar. 18, 1985

[30] Foreign Application Priority Data

Mar. 17, 1984 [JP] Japan .................. 59-051671
Mar. 26, 1984 [JP] Japan .................. 59-057981

[51] Int. Cl.⁴ ............................................. G06F 3/02
[52] U.S. Cl. ...................................... 350/342; 350/334
[58] Field of Search ................ 350/342, 334, 332; 340/784, 706, 707, 705, 765, 758, 771

[56] References Cited

U.S. PATENT DOCUMENTS 4,345,248 8/1982 Toyashi et al. .................. 350/342

Primary Examiner—Arthur G. Evans
Attorney, Agent, or Firm—Jordan and Hamburg

[57] ABSTRACT

An "active matrix" type of liquid crystal matrix display panel, in which diodes are employed as switching elements coupled to each liquid crystal display element, photo-sensing elements such as photo-diodes are formed upon the display panel to enable data input to the panel by variation of the electrical characteristics of the photo-sensing elements by selectively varying the level of light incident thereon. The photo-sensing elements, when composed of photo-diodes, can be formed during the same manufacturing process and in the same manufacturing steps as those in which the diode switching elements are formed, so that no appreciable increase in manufacturing cost is entailed by adding such a data input function.

11 Claims, 17 Drawing Figures

FLAT PANEL DISPLAY DEVICE HAVING ON-SCREEN DATA INPUT FUNCTION

BACKGROUND OF THE INVENTION

At present, flat panel or planar types of display panel utilizing liquid crystal are in widespread use. Of the various types of liquid crystal display panel, the "active matrix" type of matrix display panel has been found to offer significant advantages for application to large-area displays having a high display element density. With an active matrix display panel, an individual switching element is provided to control each of the liquid crystal display elements. These switching elements can comprise three-terminal devices, e.g., thin-film transistors, or two-terminal elements such as diodes or non-linear resistance elements. Two-terminal switching elements have the advantages of ease of manufacture of the display panel, together with stability of the switching element characteristics. However although considerable advances have been achieved in producing highly compact display panels having low power consumption, through the use of liquid crystal, very little progress has been achieved in producing input devices such as keyboards which will offer similar advantages when utilized in compact, portable electronic equipment.

Various methods of performing input of data through a display device have been proposed and implemented in the prior art. The principal method has been the use of a light pen, containing a photoelectric transducer element, which is touched to the surface of a cathode ray tube to be activated by light emitted from the CRT. The position on the CRT face which is touched by the light pen can be determined from the timings at which various points on the display are activated to emit light. Another method which has been proposed for data input utilizing a display is to utilize strain gauges to detect the positions of points on the display to which pressure is applied by touching the display face.

However such prior art methods are not suitable for utilizing a liquid crystal matrix display panel as a highly compact device for both display and input of data. That is to say, since no light is emitted by a liquid crystal display panel, a conventional type of light pen cannot be utilized. Furthermore the strain gauge method referred to above can provide only a low level of resolution, and requires the use of an additional unit which must be manufactured separately from the body of the display panel. In addition, it is desirable that the resolution for input of data utilizing a display panel, i.e. the density of data input detection points, should increase in accordance with any increase in the density of display elements in the panel.

SUMMARY OF THE INVENTION

It is an objective of the present invention to overcome the disadvantages of the prior art as discussed above, to provide a liquid crystal matrix display panel which has a data input capability having a very high degree of data input resolution, and which moreover has the advantage of ease of manufacture. In order to achieve these objectives, a liquid crystal matrix display panel according to the present invention is of the active matrix type in which diodes are utilized as switching elements, which each (or a part) of the liquid crystal display elements being provided with a switching element for control of addressing the display element by drive voltages applied thereto from scanning conductors and data conductors. In addition, such a display panel has a plurality of photo-sensing elements formed thereon, which are preferably photo-diodes, manufactured during the same manufacturing stages in which the switching diodes are formed. Data is input to the panel by selectively varying the levels of light incident on these photo-sensitive elements, and employing appropriate circuitry for sensing changes in the element characteristics resulting from such changes, with the results of this sensing constituting input data. Selective variation of the level of light falling on these photo-sensing elements can be accomplished by selectively increasing the illumination level, e.g. by applying illumination from a photo-emissive source, or by selectively reducing the illumination level, e.g. by shielding some photo-sensitive elements from ambient light. For maximum data input resolution, it is possible to provide one such photo-sensing element closely adjacent to each display element, so that as the number of display elements is increased to increase display resolution, the data input resolution will increase accordingly. It is a basic feature of the present invention that these photo-sensing elements and the switching elements are manufactured at the same time, by the same process, so that virtually no increase in manufacturing cost or complexity will result from the incorporation of such a data input capability.

Input of data with such a liquid crystal matrix display panel can be accomplished by employing a light pen which produces a very narrow beam of light at the tip of the pen, i.e. by touching the pen tip to points on the screen at which data input is to be performed.

Alternatively, by utilizing photo-sensitive elements of relatively large area, it is possible to provide a data input function by selectively shielding specific photo-sensitive elements from incident illumination, to thereby produce changes in the electrical characteristics of these elements which can be sensed as input data.

DESCRIPTION OF THE PREFERRED EMBODIMENTS

Figure 1:
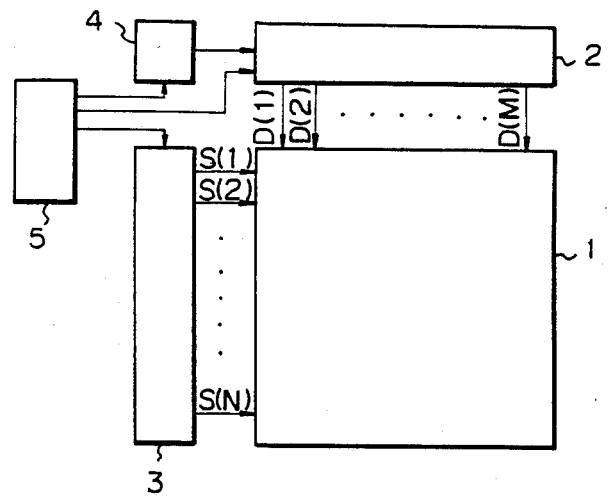
FIG. 1 is a general block diagram of a liquid crystal matrix display panel according to the present invention.
Figure 2:
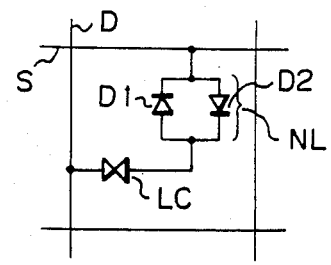
FIG. 2 is a circuit diagram of a unit picture element for a liquid crystal matrix display panel utilizing diodes as switching elements for control of display element addressing, according to the present invention.
Figure 3:
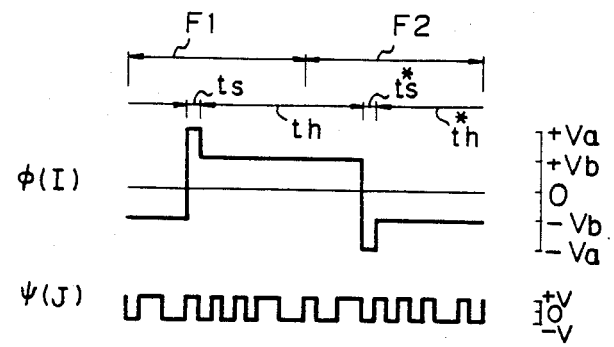
FIG. 3 is a timing diagram for illustrating a prior art drive method for unit picture elements of the form shown in FIG. 2.

Before describing embodiments of the present invention, the general configuration of a liquid crystal matrix display panel which does not have a data input capability will be discussed, referring to FIGS. 1, 2 and 3. FIG. 1 is a general block diagram of a liquid crystal matrix display panel 1 and peripheral drive circuits, with the display panel being made up of an array of display elements each of which has the circuit configuration shown in FIG. 2 and will be referred to as unit picture element. Each unit picture element is connected at an intersection of a set of scanning conductors S(1), S(2) . . . S(N) and data conductors D(1), D(2), . . . D(M), and comprises a liquid crystal display element designated as LC and a non-linear resistance element designated as NL. Each non-linear resistance element NL is made up of a pair of diodes D1 and D2 which are connected in parallel with one another with opposite directions of polarity. The non-linear resistance element NL and liquid crystal display element LC are connected in series between a data conductor D (i.e. one of the set D(1), . . . D(N)) and a scanning conductor S (i.e. one of the set S(1), . . . S(M)). The display electrode of liquid crystal display element LC is designated as DE.

Numeral 2 denotes a data conductor drive circuit, for applying data signals to the data conductors, numeral 3 denotes scanning conductor drive circuit for applying scanning signals to the scanning conductors. Numeral 4 denotes a video processing circuit for applying video signals to the data conductor drive circuit 2. Numeral 5 display elements a clock signal generating circuit for applying timing signal pulses to drive circuits 2 and 3 and to video processing circuit 4.

An active matrix type of liquid crystal matrix display panel having the basic configuration described above is disclosed in Japanese Pat. Nos. 57-167944 and 57-167945. The drive signal waveforms are shown in FIG. 3. Here, $\phi(I)$ is the scanning signal applied to the Ith scanning conductor, while $\psi(J)$ is the data signal applied to the Jth data conductor. The scanning signal $\phi(I)$ comprises selection phases denoted as $t_s$ and $t^*_s$, and holding phases denoted as $t_h$, $t^*_h$. During each selection phase, $t_s$, $t^*_s$, the scanning signal goes to the selection voltage level (+ or −Va), while during the holding phases $t_h$, $t^*_h$, the scanning signal goes to the the holding voltage level + or −Vb). The data signal $\psi(J)$ varies between the data potentials ±Vd in accordance with the contents of the display data. Such a drive method has been disclosed in Japanese Pat. No. 57-167943. This type of active matrix liquid crystal matrix display panel can be manufactured by a simple and inexpensive process, utilizing thin-film diodes to form the switching elements NL, whereby the characteristics of the switching elements can be made extremely stable. Such a technique is especially advantageous for application to large-area display panels which have a high density of display elements.

Figure 4:
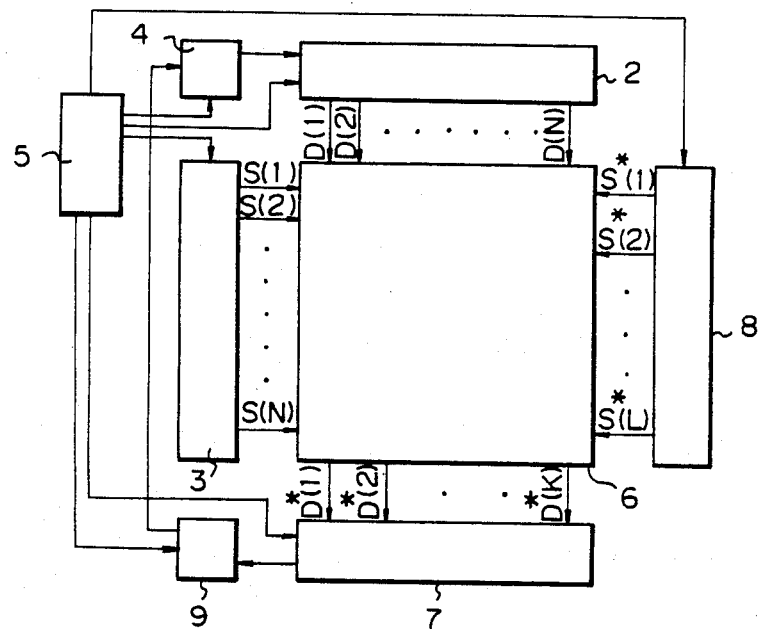
FIG. 4 is a general block diagram of a liquid crystal matrix display panel having a data input function, according to a first embodiment of the present invention.
Figure 5:
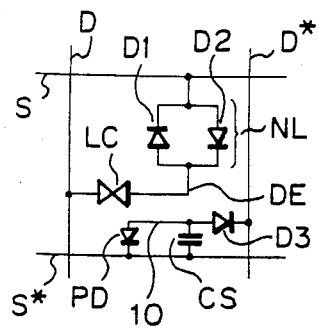
FIG. 5 is a circuit diagram of a unit picture element in the embodiment of FIG. 4.
Figure 6:
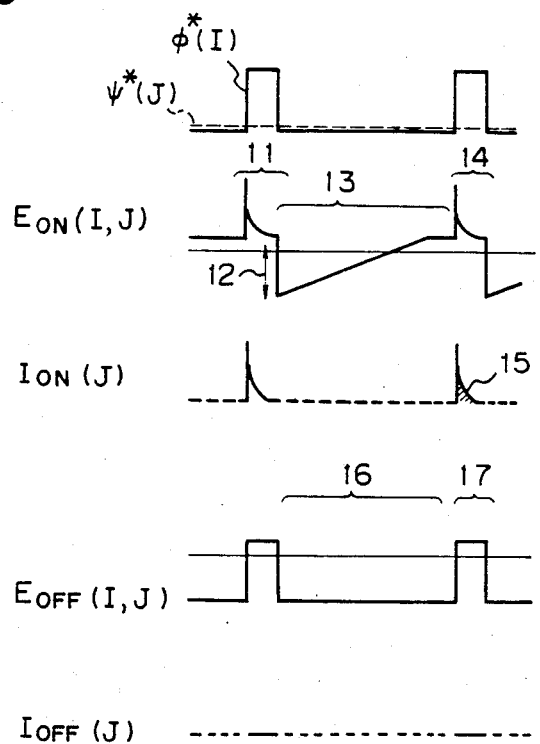
FIG. 6 is a timing diagram for illustrating data read-in operation by the embodiment of FIG. 4.

FIG. 4 is a general block circuit diagram of an embodiment of a liquid crystal matrix display panel according to the present invention, while FIG. 5 is a circuit diagram of a unit picture element for this embodiment, and FIG. 6 shows drive signal waveforms. This embodiment differs from the prior art example of FIG. 1 in that a set of data output conductors are incorporated, designated at D*(1), D*(2), . . . D*(K), together with a secondary set of scanning conductors designated as S*(1), S*(2), . . . S*(L). In addition with this embodiment, each unit picture element contains a photo-sensing element as shown in FIG. 5, designated as PD, together with a storage capacitor CS and an output diode D3. Numeral 7 denotes an output data processing circuit, and numeral 8 denotes a drive circuit for the set of secondary scanning conductors. The photo-sensing element PD, storage capacitor CS and output diode D3 are interconnected by a conductor 10. In FIG. 4, numeral 9 denotes a pattern memory, for storing data which is input through the display panel.

The data input operation of this embodiment is based upon detection of changes in the operating point of each photo-sensing element PD. In the waveform diagram of FIG. 6, $\phi^*(I)$ denotes the secondary scanning signal which is applied to the secondary scanning conductor S*(I). That is to say, such secondary scanning signals periodically scan the secondary scanning conductors to successively select these conductors, e.g. during the selection phases designates as 11, 14. A fixed potential, designated as $\psi^*(J)$ in FIG. 3, is applied to the Jth data output conductor D*(J), i.e. all of the data output conductors are connected to this fixed potential. $E_{on}$ denotes the waveform which appears on a conductor designated as 10 within a unit picture element, when the corresponding photo-sensing element PD is illuminated with an intensity of light which exceeds a certain level. Ion(J) denotes the waveform of the current discharge appearing on data output conductor D*(J), in response to potential $E_{on}$. Specifically, during each selection phase of a unit picture element (e.g. phase 11), a selection signal pulse (in this example, of positive polarity) is applied to the secondary scanning conductor S* of that unit picture element, whereby the potential appearing on line 10 is driven negative by an amount (indicated by numeral 12) which is equal to the magnitude of the secondary scanning signal pulse. Thereafter, during the subsequent holding phase (designated by numeral 13), the potential across storage capacitor CS, and hence the potential of conductor 10, will increased due to current flow through photo-sensing element PD, at a rate which is determined by the level of light incident on that photo-sensing element. As a result, at the start of the next selection interval (e.g. 14), a pulse of current will flow from conductor 10 through output diode D3, into data output conductor. If there is a high level of illumination of photo-sensing element PD, then the rate of charging of storage capacitor CS will be high, so that a large-amplitude current pulse will flow through output diode D3 at the start of each selection phase, as indicated by waveform Ion(J) in FIG. 6. If however there is a very low level of light incident on photo-sensing element PD, then the potential appearing on conductor 10 will be as indicated by $E_{off}$ in FIG. 6. That is to say, a negligible amount of charging of storage capacitor CS will take place during each holding phase (e.g. during holding phase 16), so that virtually no current will flow out of output diode D3 during each selection phase (e.g. selection phase 17). In this case the output current waveform will be as indicated by Ioff in FIG. 6.

In this way, it is possible to determine whether the level of light incident upon any particular unit picture element is above or below a predetermined level, by detecting the level of current pulses output from the corresponding output diode D3 during the corresponding selection phase intervals. Thus, data can be input through the display panel by selectively varying the level of light falling on particular picture elements.

Figure 7:
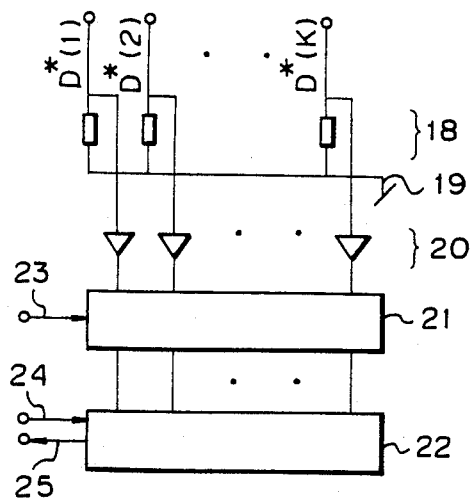
FIG. 7 is a block circuit diagram of an output data processing circuit in the embodiment of FIG. 4.

FIG. 7 is a block diagram of an example of output data processing circuit 7 in the embodiment of FIG. 4. Each of data output conductors D*(1), D*(2), . . . D*(K) is connected through a corresponding resistor 18 to a source of zero potential, designated as 19. The potential developed across each resistor 18 during a selection phase corresponds to the current which flows through the corresponding data output conductor during that interval. This potential is amplified by one of amplifier circuits 20, whose output is applied to one input of a latch circuit 21 to be stored therein at the timing of a latch signal 23. The resultant latch output signals are input to a shift register 22. Parallel-to-serial conversion of the shift register contents is performed by a signal 24 input to shift register 22, and the resultant serial signal to input to pattern memory 9. The data thus stored in memory 9, representing data inputs applied through display panel 6 by selective variation of the levels of light applied by specific picture elements are discribed hereinabove, can be input when required to video processing circuit 4, to be thereby displayed on the panel.

Figure 8A:
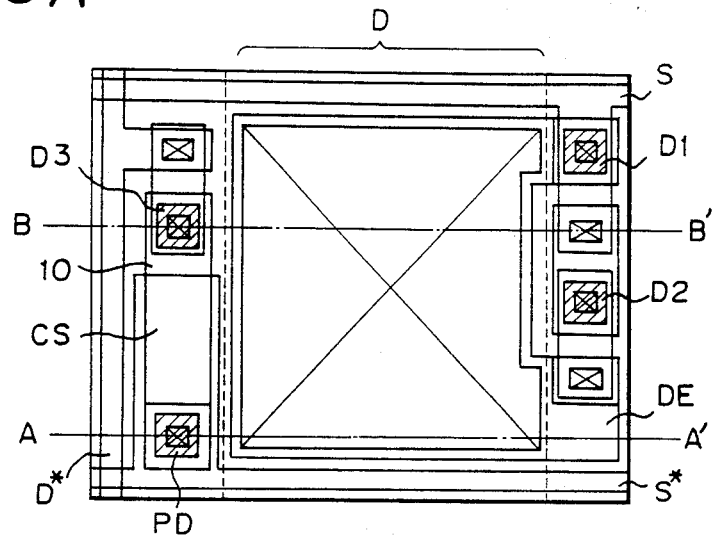
FIGS. 8A, 8B and 8C are diagrams illustrating the physical configuration of a unit picture element in the embodiment of FIG. 4.
Figure 8B:
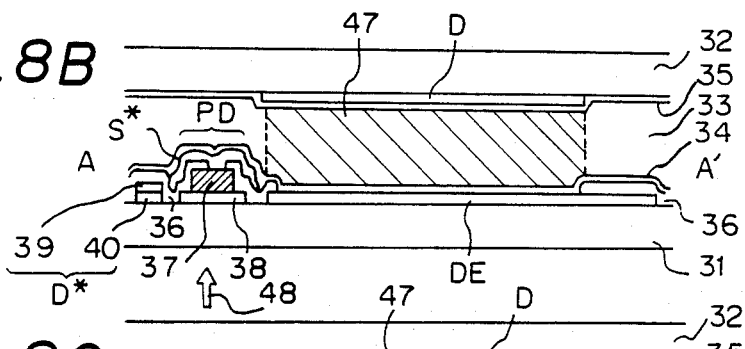
Figure 8C:
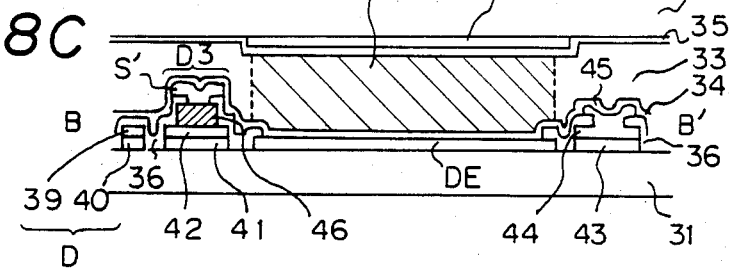

FIG. 8A shows a plan view of an example of a suitable physical configuration for a unit picture element of the form shown in FIG. 5, while FIGS. 8B and 8C show cross-sectional views in elevation, taken through lines A—A' and B—B' in FIG. 8A respectively. The reference designations D, D*, S, S*, PD, etc correspond to those in the circuit diagram of a unit picture element shown in FIG. 5. As shown in FIGS. 8B and 8C, a layer of liquid crystal 33 is sandwiched between two substrates 31 and 32. The data conductor D is formed upon one substrate 32 of the display panel, with a molecular alignement layer 35 for the liquid crystal being formed over data conductor D. The display electrode DE, a lower diode electrode 41 for photo-sensing element PD, connecting lead layers 40, 43, and a lower electrode layer 38 for output diode D3 are formed on substrate 31, from a transparent layer of electrically conducting material. In this embodiment, the interconnecting lead 10 shown in FIG. 5 constitutes one electrode of storage capacitor CS. A diode lower connecting lead layer 42, connecting lead upper layers 39, 44, and storage capacitor electrode 10 are formed from a first metallic layer, composed of a material such as Cr, Ni, etc. The semiconductor layers 46 and 37 of photo-sensing element PD and output diode D3 respectively are formed by the same manufacturing process, each having a PIN semiconductor multi-layer configuration and being composed of amorphous silicon (a-Si). An inter-layer insulating layer 36 is formed of an electrically insulating material such as $SiO_2$, $SiN_x$, etc. A linking conductor 45 and scanning conductors S and S* are formed of a second metallic layer composed of a material such as Cr, Ni, Al, Au etc. A molecular alignment layer for the liquid crystal 33 is formed over this second metallic layer. A portion 47 of the liquid crystal thereby functions as the liquid crystal display element LC shown in FIG. 5, i.e. the portion of liquid crystal layer 33 which lies directly between electrodes D and DE. The storage capacitor CS is formed by the mutually overlapping portions of secondary scanning conductor S* and storage capacitor electrode 10 (formed from the first metallic layer) and the region of inter-layer insulation layer 36 which is sandwiched between S* and electrode 10.

Diodes D1, D2 and D3 are formed of regions of semiconductor layer (i.e. the same layer which serves to form semiconductor layers 37 and 46 described above) which are sandwiched between specifically shaped portions of the first and second metallic layers referred to above.

The photo-sensing element PD formed in this way has a photo-diode configuration, comprising a transparent electrode layer 38 and a portion of secondary scanning conductor S*, with a semiconductor layer 37 sandwiched between these.

It is a basic advantage of this embodiment that the layers of material used to form the diodes and the photo-sensing element are all formed during substantially the same manufacturing process. If these were all to be produced by an identical manufacturing process, then all of the diodes would be sensitive to incident light, so that there would be an excessively high level of diode leakage current, resulting in deterioration of control characteristics. For this reason, an a non-transparent metallic layer (e.g. layer 46 in output diode D3) is formed in each diode to act as a light shield, thereby preventing such leakage current. However no additional complexity is introduced to the manufacturing process by this fact, since these light shielding layers are formed (i.e. by etching) from the same metallic layer which is used to form interconnecting leads to the diodes. In the case of photo-sensing element PD, however, one of the interconnecting leads to the element is formed of the transparent layer of electrically conducting material, so that light which is incident thereon in the direction of arrow 98 in FIG. 8B will be sensed.

It can thus be understood that this embodiment of the present invention enables both normal diodes and photo-diodes to be formed on a display panel with no significant increase in the complexity of the manufacturing process. The number of photo-etching masks required for this embodiment would be as follows. One mask for processing the first substrate (32), and five masks for processing the second substrate (31). This is in fact less than the number of masks which are required to produce an active matrix type of liquid crystal matrix display panel utilizing thin-film transistors as control elements, without inclusion of photo-sensing elements, if a conventional manufacturing process is employed. Thus, the present invention enables a liquid crystal matrix display panel including an array of photo-sensing elements for input of data to be manufactured at low cost and (due to the simplicity of the manufacturing process and of the switching elements) with a high manufacturing yield, even in the case of a display panel having a large area and high display element density.

Figure 9:
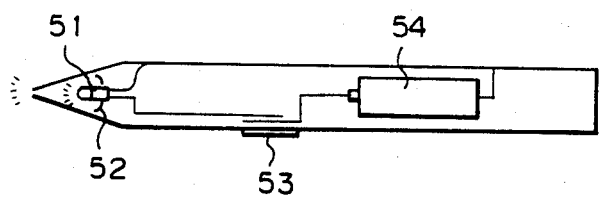
FIG. 9 is a diagram illustrating the configuration of a light pen suitable for input of data to the embodiment of FIG. 4.

FIG. 9 shows an example of a suitable type of light pen, in the shape of a pencil, for input of data such as patterns, characters etc., to the liquid crystal matrix display panel embodiment described above. Numeral 51 denotes a light-emitting diode, numeral 52 denotes a reflector for focussing the light emitted by diode 51, while power from a battery 54 is supplied to LED 51 by actuation of a switch 53. In this way, a beam of light is emitted from the tip of the light pen which can be made of sufficiently small cross-sectional area to enable activation of individual photo-sensing elements on the display panel, i.e. by touching the pen tip to a specific position on the array of display elements, then actuating switch 53.

It should be noted that it is possible, with the present invention, to provide one photo-sensing element for every liquid crystal display element in the panel, or to provide only a part of the total number of liquid crystal display elements with photo-sensing elements. In addition, the present invention is applicable to the use of other forms of switching element for control of liquid crystal display element drive voltage control besides the diode ring nonlinear resistance elements described for the above embodiment, for example it is possible to use the type of diode switch described in U.S. Pat. No. 3,654,606 for this purpose.

The present invention is also applicable to display panels which employ electro-chromism or electroluminescent types of display elements, and to various sizes and types of display panels, ranging from large-size display devices such as digitizers utilized in CAD to miniature panels for use in personal "electronic memos".

In the embodiment described above, input of data to the display panel is performed by selectively increasing the level of light incident upon photo-sensing elements formed on the panel. However it is also possible to perform this data input function by selectively reducing the level of light incident upon photo-sensing elements, e.g. by selectively shielding photo-sensing elements from ambient illumination. The present invention is directed towards liquid crystal types of display panel, so that in general, since such a display panel does not have an inherent light-emitting capability as do other types of display device such as cathode ray tubes, a minimum level of ambient illumination will always be incident upon the display panel while it is in use. If the photo-sensing elements for performing such a data input function are made sufficiently large, then input can be performed by the user simply shielding desired ones of the photo-sensing elements using a finger tip. In this way, the invention can be utilized to implement a type of keyboard input function in which only photo-diodes, formed during the same manufacturing process as the switching diode elements of the liquid crystal matrix display panel, are utilized as data input means.

With the latter data input method, since in general the photo-sensing elements will have be relatively large in area, it is preferable to dispose these photo-sensing elements outside the liquid crystal display element matrix area of the display panel, although formed upon one of the substrates upon which switching diodes and liquid crystal display element electrodes are formed. Such an embodiment of the present invention is illustrated in external view in FIG. 10. This embodiment is an ultra-miniature television receiver, in which a liquid crystal matrix display panel 1, provided with an array of liquid crystal display elements each controlled by a two-diode switching element as shown in FIG. 2 above, also has a keyboard input section 56. The keyboard input section 56 is divided into upper and lower sections, disposed respectively above and below the screen area of the TV receiver, and serve for input of commands to control operation of the receiver, i.e. commands for channel selection, volume control, picture brightness and color. FIG. 11 is a general block diagram of this embodiment, in which reference numerals corresponding to those of FIG. 4 denote corresponding components. Numeral 66 denotes a keyboard input discrimination circuit, which serves to recognize inputs applied through keyboard input section 56 and produce output signals indicative thereof. Numeral 7 denotes a central processing unit (CPU) which receives output signals from the keyboard input discrimination circuit 56, and is responsive thereto for applying control signals to video processing circuit 4, e.g. signals to control a tuner section in video processing circuit 4, etc. In addition, CPU 4 produces timing signals to control the operation of data conductor drive circuit 3 and scanning conductor drive circuit 2.

Figure 10:
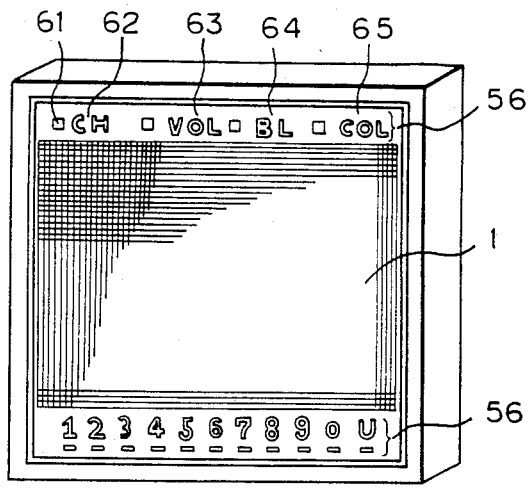
FIG. 10 is an external view of a television receiver according to a second embodiment of the present invention.
Figure 11:
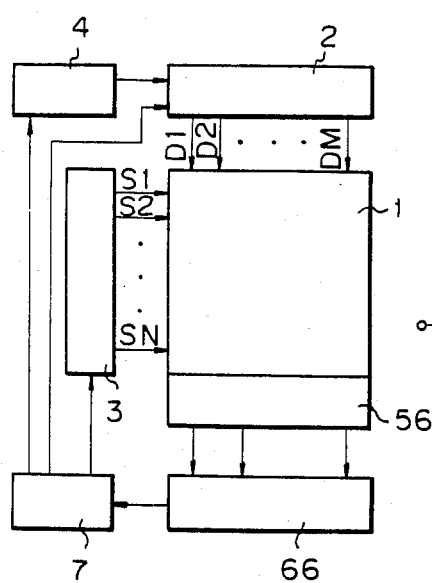
FIG. 11 is a general block diagram of the embodiment of FIG. 10.

As shown in FIG. 10, the keyboard input section 56 comprises a set of numerals 1 to 9 and 0, and a letter U. The latter symbol is activated to select a UHF television channel, while the numerals are used to select the channel number, and also for volume, brightness and color adjustment. Keyboard input section 56 further comprises symbols CH, VOL, BL and COL, used to designate channel selection, volume, brightness and color adjustment respectively.

Adjacent to each of these numerals and symbols, which each consist of a photo-sensing element referred to in the following as a primary photo-sensing element, is situated another photo-sensing element, which will be referred to as a secondary photo-sensing element. That is, secondary photo-sensing element 59 is disposed adjacent to primary photo-sensing element 58, secondary photo-sensing element 61 is disposed adjacent to secondary photo-sensing element 62, and so on.

Figure 12:
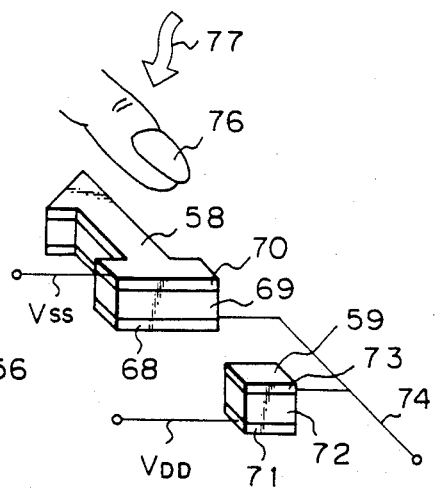
FIG. 12 is an oblique view illustrating the positional relationships and configuration of photo-sensing elements used in the embodiment of FIG. 10.

Referring now to FIG. 12, an oblique view is shown to illustrate the general configuration of one such primary photo-sensitive element, i.e. 58, and the corresponding secondary photo-sensing element 59, each of which is a photo-diode. The primary photo-sensitive element 59 comprises a lower electrode 68, formed of an electrically conducting material, and an upper electrode 70 which is transparent and electrically conductive. A layer of semiconductor 69 is sandwiched between electrodes 68 and 70. Similarly, secondary photo-sensing element 59 is made up of a lower electrode 71 and a transparent upper electrode 73, with a layer of semiconductor 72 sandwiched between these. Each of these photo-sensing elements is formed upon the same substrate of liquid crystal matrix display panel 1 as that upon which the switching control diodes for the liquid crystal display elements are formed, and is formed during the same stages of the manufacturing process in which these switching control diodes are formed, e.g. each of the photo-sensing elements can have a layer structure substantially as illustrated in FIG. 8 above for photo-diode PD and can be formed by the materials described hereinabove for manufacture of such a photo-diode PD. Thus, no increase in complexity or duration of the manufacturing process, or increase in the number of masks utilized in etching during that process, will result from addition of such a data input function to a liquid crystal matrix display panel.

Input of data is performed as illustrated in FIG. 12, i.e. by the user touching a finger tip 77 to a primary photo-sensing element such as to shield that photo-sensing element from ambient illumination 76. It is an essential feature of this embodiment that each secondary photo-sensing element, e.g. photo-sensing element 59, is positioned closely adjacent to the corresponding primary photo-sensitive element, but in such positional relationship that it is possible for the user to substantially entirely shield the primary photo-sensitive element from ambient illumination while leaving the secondary photo-sensing element substantially exposed to that illumination.

Figure 13:
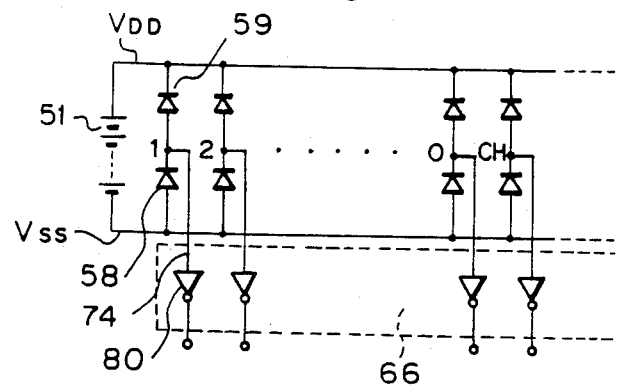
FIG. 13 is a circuit diagram of a keyboard section and an output data discrimination circuit in the embodiment of FIG. 10.
Figure 14:
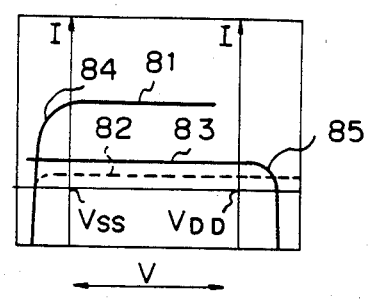
FIG. 14 is a diagram illustrating the manner in which the potential of a data sensing point is varied in accordance with changes in incident light on a photo-sensing element in the embodiment of FIG. 10.

FIG. 17 is a circuit diagram of a portion of keyboard input section 56 and keyboard input discrimination circuit 66. As shown, each primary photo-sensitive element, e.g. primary photo-sensitive element 58, is connected in series with the corresponding secondary photo-sensing element, e.g. 59, with the same direction of polarity. Potentials Vdd and Vss are applied across the ends of each of such series-connected pairs, as shown, i.e. a potential (Vdd-Vss) is applied across each pair, producing a flow of current in the diode forward direction. FIG. 14 shows the voltage/current characteristics of such a pair of series-connected primary photo-sensitive element and secondary photo-sensing element, with respect to the junction of the two photo-sensing elements e.g. junction 74 shown in FIG. 13, with the respective voltage axes of the characteristics being mutually inverted to thereby indicate the potential appearing at the junction point as that at the point of intersection of the two characteristics. Numeral 81 and 82 denote the characteristics of primary photo-sensitive element 58 when the element is exposed to full ambient illumination and when it is shielded from illumination, respectively. Numeral 83 denotes the characteristic of secondary photo-sensing element 59 when exposed to ambient illumination. The potential appearing at junction point 74 of photo-sensing elements 58 and 59 is that corresponding to point 84, i.e. the point of intersection of characteristics 81 and 83 when both are fully exposed to ambient illumination. When primary photo-sensitive element 58 is shielded from incident light and secondary photo-sensing element 58 is exposed to that light, then the potential appearing at junction point 74 will be that given by intersection point 85 in FIG. 14, i.e. the point of intersection of characteristics 82 and 83.

It can thus be understood that the potential appearing at junction point 74 can be selectively varied between two different values by selectively shielding and exposing primary photo-sensitive element 58 to incident illumination. It is an important feature of this embodiment that each primary photo-sensitive element has a larger area than the corresponding secondary photo-sensing element. If for example the ratio of the areas of a primary photo-sensitive element to the corresponding secondary photo-sensing element is made 3:1, then if 2/3 or more of the area of the primary photo-sensitive element is shielded from incident illumination, then this will be the condition at which a sudden change in the potential of the corresponding junction point will occur. That is to say, if a smaller area than 2/3 of the area of the primary photo-sensitive element is shielded, then this condition will not be sensed as a data input. This feature is important, since it is possible for a primary photo-sensitive element to be accidentally shielded to some extent from incident light while the corresponding primary photo-sensitive element is left exposed to the light. Thus, this feature will substantially eliminate the possibility of such a condition producing "noise" which will result in spurious inputs occurring. It should be also noted that the secondary photo-sensing elements serve as light-sensing reference elements, for sensing the level of ambient illumination. That is to say, any change in the ambient level of illumination falling on both a primary photo-sensitive element and the corresponding secondary photo-sensing element will have no substantial effect upon the voltage appearing at the corresponding junction point, but will only produce a change in the level of current flowing through both of these photo-sensing elements since both elements will be affected equally by the change in light level.

Figure 15:
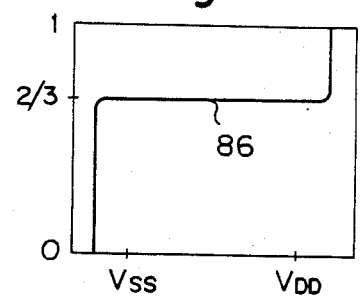
FIG. 15 is a graph to illustrate the relationship between a shielding factor of a photo-sensing element and the potential appearing at a corresponding data sensing point, for the embodiment of FIG. 10.

In the graph of FIG. 15, the shielding factor of the primary photo-sensitive element (i.e. a factor having a value of 1 when the element is fully shielded and a value of 0 when the element is fully exposed) is plotted along the vertical axis, while the voltage at the sensing point (e.g. junction point 74 in FIG. 13) is plotted along the horizontal axis. In this example it is assumed, as described above, that the ratio of the areas of the primary photo-sensitive element and the secondary photo-sensing element is 3:1.

Generally speaking, if the ratio of the areas of the primary photo-sensitive element and secondary photo-sensing element is A:B, then when the shielding factor reaches a value of A/B, a sudden change in the voltage at the sensing point will take place. If A and B were to be made equal, then this sudden change in the sensing point voltage would occur for a shielding factor of the order of zero. Thus, this would be very difficult to sense accurately. The applicant has found that the ratio of the areas of the primary and secondary photo-sensing elements should preferably be within the range 5:1 to 5:4, resulting in the sensing point voltage transition occurring for shielding factors of approximately 80% to 20% respectively. This will provide a high level of protection against erroneous data inputs resulting from variations in incident illumination or other causes.

In the above embodiment, control of all of the television receiver operation is performed by means of the photo-sensing elements, i.e. by touching appropriate ones of the primary photo-sensitive elements to thereby perform command input. For example, to select a television channel, the symbol CH is touched, then the appropriate numerals for the channel number are touched in succession. If the channel is in the UHF band, then the symbol U is touched before the channel number is input. To adjust the sound volume, the VOL symbol is touched, then one of the numerals 1 to 0 corresponding to the desired volume level is touched. Picture brightness and color can be adjusted in a similar manner, using the BL and COL symbols in conjunction with the numerals 1 to 0.

Although in the embodiment described above the keyboard input function is used to control the operation of miniature television receiver, such an input function could also be applied to implement other types of data input, e.g. for input of alphanumeric data to a liquid crystal matrix display panel used as a computer terminal display device, for example.

It will be apparent that it would be possible to utilize a single photo-sensitive element as a secondary (i.e. reference) photo-sensitive element for all of the primary photo-sensitive elements, utilizing time-sharing operation. However in that case, due to the substantial space which would separate this reference element from the primary elements, there would be a possibility of erroneous inputs occurring due to accidental shielding of elements or differences in the level of ambient illumination falling on the elements.

From the above descriptions of the preferred embodiments, it can be understood that the present invention, particularly when applied to a planar display device in which diodes are utilized as switching elements for control of the drive voltages used to address elements of a display element matrix, enables a data input function to be added to the display device without significant increase in manufacturing cost or complexity, since the photo-sensing elements used for data input can be formed as photo-diodes during the same manufacturing steps in which the switching diodes are formed. The present invention therefore can enable a data input function to be added to various types and sizes of display panel, with little or no increase in space being required to accommodate this input function, and with very little increase of manufacturing cost.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A flat panel display device having a data input function, comprising:
   a display panel having a plurality of first scanning conductors, a plurality of data conductors, and an array of display elements disposed at intersections of said scanning conductors and said data conductors;
   first scanning circuit means coupled to said first scanning conductors and data drive circuit means coupled to said data conductors, for driving said display elements to display data;
   a plurality of second scanning conductors and a plurality of data output conductors formed on said display panel, said second scanning conductors and data output conductors being positioned to mutually intersect such that at least a first part of said intersections are disposed respectively closely adjacent to corresponding ones of said display elements;
   a plurality of photo-sensing elements formed on said display panel, respectively coupled between said intersections of said second scanning conductors and data output conductors, and;
   second scanning circuit means coupled to said second scanning conductors and output data processing circuit means coupled to said data output conductors, for sensing changes in electrical characteristics of said photo-sensing elements resulting from selective variation of levels of light incident thereon and interpreting said changes as input data.

2. A flat panel display device according to claim 1, in which said display panel is a liquid crystal display panel, and in which each of said display elements comprises a liquid crystal display element and a control element for controlling addressing of said liquid crystal display element.

3. A flat panel display device according to claim 2, in which each of said control elements comprises at least one addressing control diode, and in which each of said photo-sensing elements comprises at least one photo-diode.

4. A flat panel display device according to claim 3, in which said photo-sensing elements and said addressing control diodes are manufactured by identical ones of a plurality of successively executing processing steps.

5. A flat panel display device according to claim 3, in which each of said addressing control diodes has first and second electrodes formed of electrically conducting material with at least one of said first and second electrodes being non-transparent to light, and in which each of said photo-sensing elements has first and second electrodes formed of electrically conducting material, with at least one of said first and second electrodes being transparent to light.

6. A flat panel display device according to claim 1, in which a second part of said intersections between said second scanning conductors and said data output conductors, and the corresponding one of said photo-sensing elements, are disposed at positions substantially distant from said array of display elements.

7. A flat panel display device according to claim 1, in which said selective variation of light incident on said photo-sensing elements is accomplished by selective illumination of said photo-sensing elements.

8. A planar display device according to claim 1, in which said selective variation of light incident on said photo-sensing elements is accomplished by selective shielding of said photo-sensing elements from ambient illumination incident on said display device.

9. A flat panel display device according to claim 8, in which at least a part of said photo-sensing elements are each adapted to be of a shape and size such as to permit said selective shielding to be executed by a touch of a finger tip.

10. A flat panel display device according to claim 9, in which said shape is that of a symbol.

11. A flat panel display device according to claim 7 or claim 8, in which at least part of said photo-sensing elements comprise a plurality of primary photo-sensing elements and a secondary photo-sensing elements, each of said secondary photo-sensing elements being disposed adjacent to a corresponding one of said primary photo-sensing elements and serving as reference incident light measurement means, for use in sensing changes in the level of light incident on said corresponding primary photo-sensing element.

* * * * *